US006255416B1

(12) United States Patent
Sone et al.

(10) Patent No.: US 6,255,416 B1
(45) Date of Patent: Jul. 3, 2001

(54) METHOD OF PRODUCING CONJUGATED DIENE POLYMERS

(75) Inventors: Takuo Sone; Katsutoshi Nonaka; Akio Takashima; Iwakazu Hattori, all of Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/305,260

(22) Filed: May 4, 1999

(30) Foreign Application Priority Data

May 13, 1998 (JP) ................................................. 10-146715

(51) Int. Cl.$^7$ ....................................................... C08F 4/62
(52) U.S. Cl. ........................... 526/153; 526/159; 526/114; 526/119; 526/164
(58) Field of Search .................................. 526/159, 114, 526/119, 164, 153

(56) References Cited

FOREIGN PATENT DOCUMENTS

| 0 267 675 | 5/1998 | (EP) . | |
|---|---|---|---|
| 37-8198 | 7/1937 | (JP) . | |
| 47-14729 | 5/1972 | (JP) . | |
| 62-1404 | 1/1987 | (JP) | ................................ C08F/36/04 |
| 63-64444 | 12/1988 | (JP) | ................................ C08F/36/04 |
| 1-16244 | 3/1989 | (JP) | ................................ C08F/36/04 |
| 4-2601 | 1/1992 | (JP) | ................................ C08F/36/04 |
| 4-154819 | 5/1992 | (JP) . | |
| 6-211916 | 8/1994 | (JP) | ................................ C08F/4/52 |
| 6-306113 | 11/1994 | (JP) | ................................ C08F/4/52 |
| 8-73515 | 3/1996 | (JP) | ................................ C08F/4/54 |
| 10-35633 | 2/1998 | (JP) | ................................ B65C/9/20 |
| 10-306113 | 11/1998 | (JP) | ............................... C08F/136/00 |

OTHER PUBLICATIONS

Abstract of JP 08 073535 (Mar. 19, 1996), XP002111792, Database WPI, Section Ch, Week 9621.
Abstract of JP 05 051406 (Mar. 2, 1993), XP002111793, Database WPI, Section Ch, Week 9314.
Abstract of JP 05 059103 (Mar. 9, 1993), XP002111794, Database WPI, Section Ch, Week 9315.

*Primary Examiner*—David W. Wu
*Assistant Examiner*—William Cheung
(74) *Attorney, Agent, or Firm*—Sughrue, Mion, Zinn, Macpeak & Seas, PLLC

(57) ABSTRACT

A conjugated diene polymer is obtained by using a specified catalyst system consisting of components (a)–(d) and indicating a high polymerization activity to a conjugated diene compound. Further, a modified conjugated diene polymer is obtained by reacting with at least one specified compound selected from the group consisting of components (e)–(j).

8 Claims, No Drawings

METHOD OF PRODUCING CONJUGATED DIENE POLYMERS

BACKGROUND OF THE INVENTION

1. Filed of the Invention

This invention relates to a method of producing a conjugated diene polymer by using a novel catalyst of a rare earth element compound, and more particularly to a method of producing a conjugated diene polymer having excellent wear resistance and mechanical properties and a reduced cold flow by polymerizing a conjugated diene compound with a novel catalyst of a rare earth element compound and reacting the resulting polymer just after the polymerization with at least one compound selected from the group consisting of a halogenated organometal compound, a halogenated metal compound, an organometal compound, a heterocumulene compound, a hetero three-membered compound, a halogenated isocyano compound, a carboxylic acid, an acid halide, an ester compound, a carbonic ester compound and an acid anhydride as a modifying agent.

2. Description of Related Art

Since the conjugated diene polymers play an industrially very important role, there have hitherto been proposed many proposals for a polymerization catalyst of a conjugated diene compound in the production of the conjugated diene polymer. Particularly, many polymerization catalysts giving a high content of cis-1,4-bond have been studied and developed for providing conjugated diene polymers having high performances in the thermal and mechanical properties. For example, there are well-known catalyst systems containing a compound of a transition metal such as nickel, cobalt, titanium or the like as an essential component. Among them, some catalysts have industrially and widely been used as a polymerization catalyst of butadiene, isoprene or the like (see End. Ing. Chem., 48, 784(1956) and JP-B-37-8198).

On the other hand, a catalyst system comprising a rare earth metal compound and an organometal compound of an element of Group I-III has been studied and developed in order to attain a further higher content of cis-1,4-bond and an excellent polymerization activity, and also studies on a high stereospecific polymerization using the same have been actively conducted.

In JP-B-47-14729 is disclosed a catalyst system comprising a rare earth metal compound such as cerium octanoate or the like, an alkylaluminum hydride such as isobutylalumium hydride or the like, trialkyl aluminum and an aluminum halide such as ethylaluminum dichloride or the like. Particularly, there is a description that a catalyst activity is increased by maturating the catalyst system in the presence of butadiene.

In JP-B-62-1404, JP-B-63-64444 and JP-B-1-16244 is proposed a method that the catalyst activity is enhanced by increasing a solubility of a rare earth element compound in a polymerization solvent. And also, JP-B-4-2601 discloses that a catalyst system comprising a rare earth metal compound, trialkylaluminum or aluminum hydride, and an organic halogen derivative indicates a higher activity in the polymerization of 1,3-butadiene as compared with the conventional catalyst.

However, polymers obtained by using the conventional catalyst systems including the rare earth metal compound becomes wider in the molecular weight distribution and do not sufficiently improve the wear resistance and rebound resilience.

In JP-A-6-211916, JP-A-6-306113 and JP-A-8-73515 is reported that when a two-component catalyst system consisting of a neodymium compound and methylaluminoxane is used, a high polymerization activity is indicated and a conjugated diene polymer having a narrow molecular weight distribution is obtained. However, in this polymerization method, it is required to use a greater amount of methylaluminoxane as compared with the conventional catalyst system using the organoaluminum compound in order to hold the sufficient polymerization activity and obtain a polymer having a narrow molecular weight distribution, and hence it is required to remove a greater amount of a metal retaining in the polymer. Furthermore, such a two-component catalyst system is expensive as compared with the usual organo-aluminum compound and also the cold flow becomes large to cause a problem in the storage stability, so that it comes into problem in the practical use.

In order to solve these problems, JP-A-10-35633, and JP-A-10-306113report that the cold flow can be controlled by modifying the conjugated diene polymer polymerized in the presence of the catalyst system using the methylaluminoxane with a hetero three-membered compound, a halogenated metal compound, a metal carbonate or the like. In the latter case, however, the catalyst level is to high for obtaining a polymer having a narrow molecular weight distribution, and the amount of aluminoxane used can not be reduced to a practical level. And also, a greater amount of the organoaluminum compound is used, so that there is a problem in the removal of residual metal from the polymer.

SUMMARY OF THE INVENTION

The inventors have made various studies and found out that when using a catalyst system comprising a rare earth metal compound, aluminoxane, an organoaluminum compound and a reaction product of a metal halide and Lewis base, the catalyst activity is sufficiently high even at a small amount of aluminoxane used and a conjugated diene polymer having a narrow molecular weight distribution is obtained, and also a metal retaining in the polymer can be decreased, and further the cold flow can be controlled by reacting with a specified compound (hereinafter called as a modifying agent) after the polymerization, and the resulting polymer has improved mechanical properties, processability and wear resistance, and as a result the invention has been accomplished.

According to a first aspect of the invention, there is the provision of a method of producing a conjugated diene polymer which comprises polymerizing a conjugated diene compound(s) with a catalyst consisting essentially of the following components (a) to (d).

Component (a): a compound containing a rare earth element of atomic number 57–71 in the Periodic Table or a compound obtained by reacting the compound with Lewis base;

Component (b): an aluminoxane;

Component (c): an organoaluminum compound represented by a general formula (1):

$$AlR^1R^2R^3 \qquad (1)$$

(wherein $R^1$ and $R^2$ are the same or different and are a hydrocarbon group having a carbon number of 1–10 or a hydrogen atom, and $R^3$ is a hydrocarbon group having a carbon number of 1–10 provided that $R^3$ is the same as or different from $R^1$ or $R^2$); and Component (d): a reaction product of a metal halide and Lewis base.

In the invention, it is preferable that metal halides of Group 1, Group 2 and/or Group 7 are used as the metal halide constituting the component (d), and phosphoric ester, diketone compound, carboxylic acid and/or alcohol are used as Lewis base.

In the polymer obtained by polymerizing the conjugated diene compound with the catalyst consisting essentially of the components (a)–(d), it is preferable that a content of cis-1,4-bond is not less than 90% and a ratio (Mw/Mn) of weight average molecular weight (Mw) to number average molecular weight (Mn) as measured by a gel permeation chromatography is not more than 3.5.

According to a second aspect of the invention, there is the provision of a method of producing a conjugated diene polymer which comprises reacting (hereinafter called as modifying) with at least one compound selected from the group consisting of the following components (e) to (j) after the completion of the polymerization described in the first aspect of the invention.

Component (e): a halogenated organometal compound, a halogenated metal compound or an organometal compound represented by a general formula: (2), (3), (4), (5) or (6):

$$R^4_n M'X_{4-n} \tag{2}$$

$$M'X_4 \tag{3}$$

$$M'X_3 \tag{4}$$

$$R^4_n M'(R^5—COOR^6)_{4-n} \tag{5}$$

$$R^4_n M'(R^5—COR^6)_{4-n} \tag{6}$$

(wherein $R^4$ and $R^5$ are the same or different and are a hydrocarbon group having a carbon number of 1–20, $R^6$ is a hydrocarbon group having a carbon number of 1–20 and may contain a carbonyl group or an ester group in its side chain, M' is a tin atom, a silicon atom, a germanium atom or a phosphorus atom, X is a halogen atom, and n is an integer of 0–3);

Component (f): a heterocumulene compound containing in its molecule a bond of a general formula (7):

$$Y=C=Z \tag{7}$$

(wherein Y is a carbon atom, an oxygen atom, a nitrogen atom or a sulfur atom, and Z is an oxygen atom, a nitrogen atom or a sulfur atom);

Component (g): a hetero three-membered compound containing in its molecule a bond of a general formula (8):

(wherein Y' is an oxygen atom, a nitrogen atom or a sulfur atom);

Component (h): a halogenated isocyano compound;
Component (i): a carboxylic acid, an acid halide, an ester compound, a carboxylic ester compound or an acid anhydride represented by a general formula (9), (10), (11), (12), (13) or (14):

$$R^7—(COOH)_m \tag{9}$$

$$R^8—(COX)_m \tag{10}$$

$$R^9COO—R^{10} \tag{11}$$

$$R^{11}—OCOO—R^{12} \tag{12}$$

$$R^{13}—(COOCO—R^{14})_m \tag{13}$$

(wherein $R^7$ to $R^{15}$ are the same or different and are a hydrocarbon group having a carbon number of 1–50, X is a halogen atom and m is an integer of 1–5);

Component (j): a metal salt of a carboxylic acid represented by a general formula (15), (16) or (17):

$$R^{16}_l M''(OCOR^{17})_{4-l} \tag{15}$$

$$R^{18}_l M''(OCO—R^{19}—COOR^{20})_{4-l} \tag{16}$$

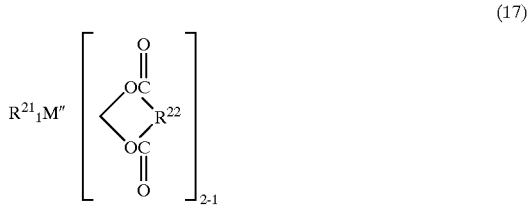

(wherein $R^{16}$ to $R^{22}$ are the same or different and are a hydrocarbon group having a carbon number of 1–20, M" is a tin atom, a silicon atom or a germanium atom, and l is an integer of 0–3).

In the polymer obtained by reacting with at least one compound selected from the group consisting of the components (e)–(j), it is preferable that a content of cis-1,4-bond is not less than 90% and a ratio (Mw/Mn) of weight average molecular weight (Mw) to number average molecular weight (Mn) as measured by a gel permeation chromatography is not more than 4.

DESCRIPTION OF PREFERRED EMBODIMENTS

The component (a) used in the catalyst according to the invention is a compound containing a rare earth element of atomic number 57–71 in the Periodic Table (rare earth element compound) or a reaction product obtained by reacting the compound with Lewis base. As the rare earth element, neodymium, praseodymium, cerium, lanthanum, gadolinium and the like or a mixture thereof are preferable, and neodymium is more favorable.

The rare earth element compound according to the invention is a carboxylate, an alkoxide, a β-diketone complex, a phosphate or a phosphite. Among them, the carboxylate and phosphate are preferable, and the carboxylate is more favorable.

The carboxylate of rare earth element is represented by a general formula (18):

$$(R^{23}—CO_2)_3M \tag{18}$$

(wherein M is a rare earth element of atomic number 57–71 in the Periodic Table, and $R^{23}$ is a hydrocarbon group having a carbon number of 1–20, preferably a saturated or unsaturated alkyl group and is a straight chain or a branched chain or a ring and carboxyl group is bonded to a primary, secondary or tertiary carbon atom thereof).

As the carboxylic acid, mention may be made of octanoic acid, 2-ethyl-hexanoic acid, oleic acid, stearic acid, benzoic acid, napthenic acid, versatic acid (trade name made by Shell Chemical Corporation, a carboxylic acid in which carboxyl group is bonded to a tertiary carbon atom) and the like. Among them, 2-ethyl-hexanoic acid, napthenic acid and versatic acid are preferable.

The alkoxide of rare earth element has a general formula (19):

$$(R^{24}O)_3M \tag{19}$$

(wherein M is a rare earth element of atomic number 57–71 in the Periodic Table). As an example of alkoxy group represented by $R^{24}O$, mention may be made of 2-ethylhexylalkoxy group, oleylalkoxy group, stearylalkoxy group, phenoxy group, benzylalkoxy group and the like. Among them, 2-ethyl-hexylalkoxy group and benzylalkoxy group are preferable.

As the β-diketone complex of rare earth element, mention may be made acetylacetone complex, benzoylacetone complex, propionitrile acetone complex, valerylacetone complex, ethylacetylacetone complex and the like. Among them, acetylacetone complex and ethylacetylacetone complex are preferable.

As the phosphate or phosphite of rare earth element, mention may be made of bis(2-ethylhexyl) phosphate, bis(1-methylheptyl) phosphate, bis(p-nonylphenyl) phosphate, bis(polyethylene glycol-p-nonylphenyl) phosphate, (1-methylheptyl)(2-ethylhexyl) phosphate, (2-ethylhexyl) (p-nonylphenyl) phosphate, 2-ethylhexyl, mono-2-ethylhexyl phosphonate, 2-ethylhexyl, mono-p-nonylphenyl phosphonate, bis(2-ethylhexyl) phosphite, bis(1-methylheptyl) phosphite, bis(p-nonylphenyl) phosphite, (1-methylheptyl)(2-ethylhexyl) phosphite, (2-ethylhexyl)(p-nonylphenyl) phosphite and the like of the rare earth element. Among them, bis(2-ethylhexyl) phosphate, bis(1-methylheptyl) phosphate, 2-ethylhexyl, mono-2-ethylhexyl phosphite and bis(2-ethylhexyl) phosphite are favorable.

Among the above compounds, phosphates of neodymium and carboxylates of neodymium are preferable, and carboxylates of neodymium such as neodymium 2-ethylhexanoate, neodymium versatate and the like are most preferable as the rare earth element compound.

Lewis base is used for easily solubilizing the rare earth element compound or stably storing over a long time of period. In this case, Lewis base is mixed with the rare earth element compound at a molar ratio of 0–30 mole, preferably 1–10 mole per 1 mole of the rare earth element, or Lewis base and the rare earth element compound are used as a product obtained by previously reacting both the compounds.

As Lewis base, mention may be made of acetylaccetone, tetrahydrofuran, pyridine, N,N-dimethylformamide, thiophene, diphenyl ether, triethylamine, an organophosphorus compound, and a monovalent or bivalent alcohol.

As the component (a), the above rare earth element compounds or reaction products obtained by reacting these compounds with Lewis base may be used alone or in admixture of two or more compounds.

The component (b) used in the catalyst according to the invention is an aluminoxane having a chemical structure shown by the following formula (20) or (21):

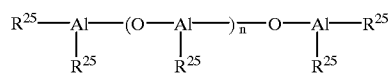
(20)

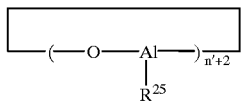
(21)

(wherein $R^{25}$ is a hydrocarbon group having a carbon number of 1–20, and n' is an integer of not less than 2). And also, the component (b) may be an associated body of aluminoxanes shown in Fine Chemical, 23, (9), 5 (1994), J. Am. Chem. Soc., 115, 4971 (1993) and J. Am. Chem. Soc., 117, 6465 (1995).

In the aluminoxane represented by the formula (I) or (II), the hydrocarbon group represented by $R^{25}$ includes methyl group, ethyl group, propyl group, n-butyl group, isobutyl group, t-butyl group, hexyl group, isohexyl group, octyl group, isooctyl group and the like. Among them, methyl group, ethyl group, isobutyl group and t-butyl group are preferable, and methyl group is most preferable. And also, n' is an integer of not less than 2, preferably 4–100.

As the aluminoxane, mention may be made of methylaluminoxane, ethylaluminoxane, n-propylaluminoxane, n-butylaluminoxane, isobutylaluminoxane, t-butylaluminoxane, hexylaluminoxane, isohexylaluminoxane and the like.

The production of the aluminoxane may be carried out by any well-known techniques. For example, an aluminoxane can be produced by adding trialkylaluminum or dialkylaluminum monochloride to an organic solvent such as benzene, toluene, xylene or the like and then adding and reacting water, steam, steam-containing nitrogen gas, or a salt having water of crystallization such as copper sulfate pentahydrate, aluminum sulfate hexadecahydrate or the like thereto.

As the component (b), the above aluminoxanes may be used alone or in an admixture thereof.

The component (c) used in the catalyst according to the invention is an organoaluminum compound represented by the general formula (1):

$$AlR^1R^2R^3 \tag{1}$$

(wherein $R^1$ and $R^2$ are the same or different and are a hydrocarbon group having a carbon number of 1–10 or a hydrogen atom, and $R^3$ is a hydrocarbon group having a carbon number of 1–10 provided that $R^3$ is the same as or different from $R^1$ or $R^2$), which includes, for example, trimethylaluminum, triethylaluminum, tri-n-propylaluminum, tri-isopropylaluminum, tri-n-butylaluminum, tri-isobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, di-isobutylaluminum hydride, dihexylaluminum hydride, di-isohexylaluminum hydride, di-isooctylaluminum hydride, ethylaluminum dihydride, n-propylaluminum dihydride, isobutylaluminum dihydride and the like. Among them, triethylaluminum, tri-isobutylaluminum, diethylaluminum hydride and di-isobutylaluminum hydride are preferable.

As the component (c) according to the invention, the above organoaluminum compounds may be used alone or in admixture of two or more compounds.

The component (d) used in the catalyst according to the invention is a reaction product of a metal halide and Lewis base.

As the metal halide, mention may be made of beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold bromide, gold iodide and the like. Among them, magnesium chloride, calcium chloride, barium chloride, manganese chloride, zinc chloride and copper chloride are preferable, and magnesium chloride, manganese chloride, zinc chloride and copper chloride are most preferable.

As Lewis base used for the formation of the reaction product with the metal halide, a phosphorus compound, a carbonyl compound, a nitrogen compound, an ether compound, an alcohol and the like are preferable. Concretely, they include tributyl phosphate, tri-2-ethylhexyl phosphate, triphenyl phosphate, tricresyl phosphate, triethyl phosphine, tributyl phosphine, triphenyl phosphine, diethylphosiphino ethane, acetylacetone, benzoylacetone, propionitoril acetone, valeryl acetone, ethylacetyl acetone, methyl acetoacetate, ethyl acetoacetate, phenyl acetoacetate, dimethyl malonate, diethyl malonate, diphenyl malonate, acetic acid, octanoic acid, 2-ethyl-hexanoic acid, oleic acid, stearic acid, benzoic acid, naphthenic acid, versatic acid (trade name, made by Shell Chemical Corp., which is a carboxylic acid having a carboxyl group bonded to a tertiary carbon atom), triethylamine, N,N-dimethyl acetoamide, tetrahydrofuran, diphenyl ether, 2-ethylhexyl alcohol, oleyl alcohol, stearyl alcohol, phenol, benzyl alcohol, 1-decanol, lauryl alcohol and the like. Among them, tri-2-ethylhexyl phosphate, tricresyl phosphate, acetylacetone, 2-ethylhexanoic acid, versatic acid, 2-ethylhexyl alcohol, 1-decanol and lauryl alcohol are preferable.

The above Lewis base is reacted at a rate of 0.01–30 mol, preferably 0.5–10 mol per 1 mol of the metal halide. By using the reaction product can be reduced metal retaining in the polymer.

The amount of each component or composition ratio in the catalyst according to the invention is set to a given value in accordance with the use purpose or necessity.

In this connection, the component (a) is preferable to be used in an amount of 0.00001–1.0 mmol per 100 g of the conjugated diene compound. When the amount is less than 0.00001 mmol, the polymerization activity undesirably lowers, while when it exceeds 1.0 mmol, the catalyst concentration becomes undesirably high and the step of removing ash is required. Preferably, the component (a) is used in an amount of 0.0001–0.5 mmol.

In general, the amount of the component (b) used can be represented by a molar ratio of Al to the component (a). The molar ratio of component (a) to component (b) is 1:1–1:500, preferably 1:3–1:250, more particularly 1:5–1:200.

Further, a molar ratio of component (a) to component (c) is 1:1–1:700, preferably 1:3–1:500, and a molar ratio of component (a) to component (d) is 1:0.1–1:30, preferably 1:0.2–1:15.

If the component amount or molar ratio of the components is outside the above defined range, the resulting catalyst does not act as a high activity catalyst or the step of removing a catalyst residue is undesirably required. Moreover, the polymerization reaction may be carried out by coexisting a hydrogen gas together with the above components (a)–(d) for adjusting the molecular weight of the polymer.

In addition to the above components (a) to (d), a conjugated diene compound and/or a non-conjugated diene compound may be added in an amount of 0–1,000 mol per 1 mol of the component (a) as a catalyst component, if necessary. As the conjugated diene compound used in the production of the catalyst, use may be made of the same monomer as used in the polymerization such as 1,3-butadiene, isoprene and the like. As the non-conjugated diene compound, mention may be made of divinylbenzene, diisopropenyl benzene, triisopropenyl benzene, 1,4-vinylhexadiene, ethylidene norbornene and the like. The conjugated diene compound as a catalyst component is not essential, but provides a merit of more improving the catalyst activity when it is used together with the components (a)–(d).

The catalyst according to the invention is produced, for example, by reacting the components (a)–(d) dissolved in a solvent or further with the conjugated diene compound and/or non-conjugated diene compound, if necessary. In this case, the addition order of these components is optional. It is favorable that these components are previously mixed and reacted and then maturated from a viewpoint of the improvement of polymerization activity and the shortening of polymerization induction period. The maturating temperature is 0–100° C., preferably 20–80° C. When the temperature is lower than 0° C., the sufficient maturation is not conducted, while when it exceeds 100° C., the catalyst activity lowers and the broadening of molecular weight distribution is undesirably caused. The maturating time is not particularly restricted, but is usually not less than 0.5 minute. The maturation may be conducted by contacting the components with each other in a line before the addition to a polymerization reaction vessel and is stable over several days.

In the invention, the conjugated diene compound(s) is polymerized with the catalyst consisting essentially of the above components (a)–(d).

As the conjugated diene compound polymerizable by the catalyst according to the invention, mention may be made of 1,3-butadiene, 2-methyl-1,3-butadiene (or isoprene), 2,3-dimethyl-1,3-butadiene, 1,3-pentadiene, 1,3-hexadiene, myrcene, cyclo-1,3-pentadiene and the like. These conjugated diene compounds may be used alone or in admixture of two or more compounds. Moreover, a copolymer is obtained when using a mixture of these compounds.

The polymerization of the conjugated diene compound according to the invention may be carried out in the absence of a solvent or by using a polymerization solvent.

The solvent for the polymerization is an inert organic solvent, which includes, for example, a saturated aliphatic hydrocarbon having a carbon number of 4–10 such as butane, pentane, hexane, heptane or the like; a saturated alicyclic hydrocarbon having a carbon number of 6–20 such as cyclopentane, cyclohexane or the like; a monoolefin such as 1-butene, 2-butene or the like; an aromatic hydrocarbon such as benzene, toluene, xylene or the like; and a halogenated hydrocarbon such as methylene chloride, chloroform, carbon tetrachloride, trichloroethylene, perchloroethylene, 1,2-dichloroethane, chlorobenzene, bromobenzene, chlorotoluene or the like.

These polymerization solvents may be used alone of in admixture of tow or more solvents.

The polymerization temperature is usually −30° C.–+200° C., preferably 0–150° C. The polymerization reaction may be batch type or continuous type.

In order to deactivate the catalyst according to the invention and the resulting polymer in the production of the polymer, it is necessary to prevent the incorporation of a compound having a deactivation action such as oxygen, water, carbon dioxide gas or the like into the polymerization system as far as possible.

According to the invention, a conjugated diene polymer having a high content of cis-1,4-bond and a sharp molecular weight distribution can be obtained because the specified catalyst is used.

The conjugated diene polymer obtained by using the catalyst consisting essentially of the components (a)–(d) before modification has a cis-1,4-bond content of not less than 90%, preferably not less than 93% and a Mw (weight-average molecular weight)/Mn (number-average molecular weight) ratio of not more than 3.5, preferably not more than 3.0, more particularly not more than 2.5 as measured by a gel permeation chromatography. When the cis-1,4-bond content in the conjugated diene polymer is less than 90%, the mechanical properties and wear resistancebecome poor. The adjustment of the cis-1,4-bond content can easily be carried out by properly controlling the polymerization temperature.

When the Mw/Mn ratio in the conjugated diene polymer exceeds 3.5, the mechanical properties and wear resistance become poor. The adjustment of the Mw/Mn ratio can easily be carried out by properly controlling the molar ratio of the components (a)–(d).

Moreover, the conjugated diene polymer is favorable to have a 1,2-vinyl bond content of not more than 2.5%. When the 1,2-vinyl bond content exceeds 2.5%, the mechanical properties and wear resistance become poor.

And also, the conjugated diene polymer is favorable to have a Mooney viscosity ($ML_{1+4}$, 100° C.) of 10–100. When the Mooney viscosity is less than 10, the mechanical properties and wear resistance after vulcanization become poor, while when it exceeds 100, the processability in the kneading becomes poor and the mechanical properties are degraded.

In the invention, a conjugated diene polymer having an increased molecular weight or a branched polymer chain is further formed by polymerizing the conjugated diene compound(s) with the above catalyst containing the rare earth element compound to form an unmodified polymer and then adding at least one compound having a specified functional group (selected from the group consisting of the components (e)–(j) as previously mentioned) as a modifying agent to react (or modify) an active terminal of the unmodified polymer with the specified functional group. By such a modification are improved the wear resistance, mechanical properties and cold flow of the polymer.

The component (e) to be reacted with the active terminal of the unmodified polymer is a halogenated organometal compound or a halogenated metal compound represented by the following formula (2), (3) or (4):

$$R^4{}_nM'X_{4-n} \qquad (2)$$

$$M'X_4 \qquad (3)$$

$$M'X_3 \qquad (4)$$

(wherein $R^4$ is a hydrocarbon group having a carbon number of 1–20, M' is a tin atom, a silicon atom, a germanium atom or a phosphorus atom, X is a halogen atom, and n is an integer of 0–3).

When M' in the formulae (2)–(4) is a tin atom, the component (e) includes, for example, triphenyltin chloride, tributyltin chloride, tri-isopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride, tin tetrachloride and the like.

When M' in the formulae (2)–(4) is a silicon atom, the component (e) includes, for example, triphenyl chlorosilane, trihexyl chlorosilane, trioctyl chlorosilane, tributyl chlorosilane, trimethyl chlorosilane, diphenyl dichlorosilane, dihexyl dichlorosilane, dioctyl dichlorosilane, dibutyl dichlorosilane, dimethyl diclilorosilane, methyl dichlorosilane, phenyl chlorosilane, hexyl trichlorosilane, octyl trichlorosilane, butyl trichlorosilane, methyl trichlorosilane, silicon tetrachloride and the like.

When M' in the formulae (2)–(4) is a germanium atom, the component (e) includes, for example, triphenylgermanium chloride, dibutylgermanium dichloride, diphenylgermanium dichloride, butylgermanium trichloride, germanium tetrachloride and the like.

When M' in the formulae (2)–(4) is a phosphorus atom, the component (e) includes, for example, phosphorus trichloride and the like.

As the component (e), use may be made of an organometal compound containing ester group or carbonyl group in its molecule shown by the following formula (5) or (6):

$$R^4{}_nM(R^5-COOR^6)_{4-n} \qquad (5)$$

$$R^4{}_nM'(R^5-COR^6)_{4-n} \qquad (6)$$

(wherein $R^4$ and $R^5$ are the same or different and are a hydrocarbon group having a carbon number of 1–20, $R^6$ is a hydrocarbon group having a carbon number of 1–20 and may contain an ester group in its side chain, M' is a tin atom, a silicon atom, a germanium atom or a phosphorus atom, and n is an integer of 0–3).

As the component (e), the above compounds may be used by combining them in an arbitrary ratio.

The component (f) to be reacted with the active terminal of the unmodified polymer is a heterocumulene compound having a chemical structure shown in the following formula (7):

$$Y=C=Z \qquad (7)$$

(wherein Y is a carbon atom, an oxygen atom, a nitrogen atom or a sulfur atom, and Z is an oxygen atom, a nitrogen atom or a sulfur atom).

That is, the component (f) is a ketene compound when Y is a carbon atom and Z is an oxygen atom, a thioketene compound when Y is a carbon atom and Z is a sulfur atom, an isocyanate compound when Y is a nitrogen atom and Z is an oxygen atom, a thioisocyanate compound when Y is a nitrogen atom and Z is a sulfur atom, a carbodiimide compound when both Y and Z are nitrogen atoms, carbon dioxide when both Y and Z are oxygen atoms, a carbonyl sulfide when Y is an oxygen atom and Z is a sulfur atom, or carbon disulfide when both Y and Z are sulfur atoms. However, Y and Z in the formula (V) is not limited to these combinations.

As the ketene compound, mention may be made of ethylketene, butylketene, phenylketene, toluylketene and the like.

As the thioketene compound, mention may be made of ethylene thioketene, butylthioketene, phenylthioketene, toluylthioketene and the like.

As the isocyanate compound, mention may be made of phenyl isocyanate, 2,4-tolylene diisocyanate, 2,6-tolylene diisocyanate, diphenylmethane diisocyanate, polymeric type diphenylmethane diisocyanate, hexamethylene diisocyanate and the like.

As the thioisocyanate compound, mention may be made of phenyl thioisocyanate, 2,4-tolylene dithioisocyanate, hexamethylene dithioisocyanate and the like.

As the carbodiimide compound, mention may be made of N,N'-diphenylcarbodiimide, N,N'-cthylcarbodiimide and the like.

The component (g) to be reacted with the active terminal of the unmodified polymer is a hetero three-membered compound having a chemical structure shown by the following formula (8):

 (8)

(wherein Y' is an oxygen atom, a nitrogen atom or a sulfur atom).

That is, the component (g) is an epoxy compound when Y' is an oxygen atom, an ethyleneimine compound when Y' is a nitrogen atom, or a thiirane compound when Y' is a sulfur atom.

As the epoxy compound, mention may be made of ethylene oxide, propylene oxide, cyclohexene oxide, styrene oxide, epoxidated soybean oil, epoxidated natural rubber, butyl glycidyl ether, phenyl glycidyl ether, 2-ethylhexyl glycidyl ether, allyl glycidyl ether, ethylene glycol diglycidyl ether, neopentyl glycol diglycidyl ether, trimethylol propane polyglycidyl ether, glycerol polyglycidyl ether, polypropylene glycol diglycidyl ether, polyethylene glycol diglycidyl ether, sorbitol polyglycidyl ether, glycidyl methacrylate, glycidyl acrylate, 3-glycidyloxypropyl trimetlioxysilane, 3-glycidyloxypropyl trietlioxysilane, 3-glycidyloxypropyl triphenoxysilane, (3-glycidyloxypropyl)methyl dimethoxysilane, (3-glycidyloxypropyl)methyl diethoxysilane, (3-glycidyloxypropyl)methyl diphenoxysilane, condensate of (3-glycidyloxypropyl)methyl dimethoxysilane, condensate of (3-glycidyloxypropyl)methyl diethoxysilane, β-(3,4-epoxycyclohexyl)ethyl trimethoxysilane, N,N-diglycidyl aniline, N,N-diglycidyl toluidine, N,N-glycidylglycidyloxy aniline, tetraglycidyl aminodiphenyl methane and the like.

As the ethyleneimine compound, mention may be made of ethyleneimine, propyleneimine, N-phenyl ethyleneimine, N-(β-cyanoethyl) ethyleneimine and the like.

As the thiirane compound, mention may be made of thiirane, methyl thiirane, phenyl thiirane and the like.

The component (h) to be reacted with the active terminal of the unmodified polymer is a halogenated isocyano compound having a chemical structure shown by the following formula (22):

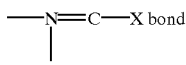 (22)

(wherein X is a halogen atom).

As the halogenated isocyano compound, mention may be made of 2-amino-6-chloropyridine, 2,5-dibromopyridine, 4-chloro-2-phenyl quinazoline, 2,4,5-tribromo imidazole, 3,6-dichloro-4-methyl pyridazine, 3,4,5-trichloro pyridazine, 4-amino-6-chloro-2-mercapto pyrimidine, 2-amino-4-chloro-6-methyl pyrimidine, 2-amino-4,6-dichloro pyrimidine, 6-chloro-2,4-dimethoxy pyrimidine, 2-chloropyrimidine, 2,4-dichloro-6-methyl pyrimidine, 4,6-dichloro-2-(methylthio) pyrimidine, 2,4,5,6-tetrachloro pyrimidine, 2,4,6-trichloro pyrimidine, 2-amino-6-chloro pyrazine, 2,6-dichloro pyrazine, 2,4-bis(methylthio)-6-chloro-1,3,5-triazine, 2,4,6-trichloro-1,3,5-triazine, 2-bromo-5-nitrothiazole, 2-chlorobenzo thiazole, 2-chlorobenzo oxazole and the like.

The component (i) to be reacted with the active terminal of the unmodified polymer is a carboxylic acid, an acid halide, an ester compound, a carboxylic ester compound or an acid anhydride having a chemical structure as shown by the following formulae (9)–(14):

 (9)
 (10)
 (11)
 (12)
 (13)

 (14)

(wherein $R^7$ to $R^{15}$ are the same or different and are a hydrocarbon group having a carbon number of 1–50, X is a halogen atom, and m is an integer of 1–5).

As the carboxylic acid shown by the formula (9), mention may be made of acetic acid, stearic acid, adipic acid, maleic acid, benzoic acid, acrylic acid, methacrylic acid, phthalic acid, isophthalic acid, terephthalic acid, trimellitic acid, pyromellitic acid, mellitic acid, full or partial hydrate of polymethacrylic acid ester or polyacrylic acid ester and the like.

As the acid halide shown by the formula (10), mention may be made of acetic acid chloride, propionic acid chloride, butanoic acid chloride, isobutanoic acid chloride, octanoic acid chloride, acrylic acid chloride, benzoic acid chloride, stearic acid chloride, phthalic acid chloride, maleic acid chloride, oxalic acid chloride, acetyl iodide, benzoyl iodide, acetyl fluoride, benzoyl fluoride and the like.

As the ester compound shown by the formula (11), mention may be made of ethyl acetate, ethyl stearate, diethyl adipate, diethyl maleate, methyl benzoate, ethyl acrylate, ethyl methacrylate, diethyl phthalate, dimethyl terephthalate, tributyl trimellitate, tetraoctyl pyromellitate, hexamethyl mellitate, phenyl acetate, polymethyl methacrylate, polyethyl acrylate, poly-isobutyl acrylate and the like. As the carbonic ester compound shown by the formula (12), mention may be made of dimethyl carbonate, diethyl carbonate, dipropyl carbonate, dihexyl carbonate, diphenyl carbonate and the like.

As the acid anhydride shown by the formula (13), mention may be made of acetic anhydride, propionic anhydride, isobutyric anhydride, isovaleric anhydride, heptanoic anhydride, cinnamic anhydride and the like. As the acid anhydride shown by the formula (14), succinic anhydride, methylsuccinic anhydride, maleic anhydride, glutaric anhydride, citraconic anhydride, phthalic anhydride, styrene-maleic anhydride copolymer and the like.

Moreover, the compound as the component (i) may contain a non-protonic polar group such as ether group, tertiary amino group or the like in its molecule within a range not damaging the object of the invention. And also, the compounds as the component (i) may be used alone or in admixture of two or more compounds. Further, the component (i) may contain a compound having free alcohol group or phenyl group as an impurity.

The component (j) to be reacted with the active terminal of the unmodified polymer is a metal salt of carboxylic acid having a structure as shown by the formulae (15)–(17):

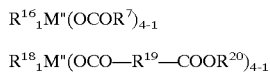

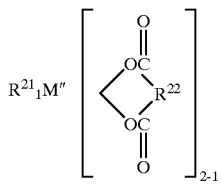

(wherein $R^{16}$ to $R^{22}$ are the same or different and are a hydrocarbon group having a carbon number of 1–20, M" is a tin atom, a silicon atom or a germanium atom, and 1 is an integer of 0–3).

As the compound shown by the formula (15), mention may be made of triphenyltin laurate, triphenyltin-2-ethylhexatate, triphenyltin naphthenate, triphenyltin acetate, triphenyltin acrylate, tri-n-butyltin laurate, tri-n-butyltin 2-ethylhexatate, tri-n-butyltin naphthenate, tri-n-butyltin acetate, tri-n-butyltin acrylate, tri-t-butyltin laurate, tri-t-butyltin 2-ethylhexatate, tri-t-butyltin naphthenate, tri-t-butyltin acetate, tri-t-butyltin acrylate, tri-isobutyltin laurate, tri-isobutyltin-2-ethylhexatatc, tri-isobutyltin naphthenate, tri-isobutyltin acetate, tri-isobutyltin acrylate, tri-isopropyltin laurate, tri-ispropyltin 2-ethylhexatate, tri-isopropyltin napthenate, tri-isopropyltin acetate, tri-isopropyltin acrylate, trihexyltin laurate, trihexyltin 2-ethylhexatate, trihexyltin acetate, trihexyltin acrylate, trioctyltin laurate, trioctyltin 2-ethylhexatate, trioctyltin napthenate, trioctyltin acetate, trioctyltin acrylate, tri-2-ethylhexyltin laurate, tri-2-ethylhexyltin 2-ethylhexatate, tri-2-ethylhexyltin naphthenate, tri-2-ethylhexyltin acetate, tri-2-ethylhexyltin acrylate, tristearyltin laurate, tristearyltin 2-ethylhexatate, tri stearyltin naphthenate, tristearyltin acetate, tristearyltin acrylate, tribenzyltin laurate, tribenzyltin 2-ethylhexatate, tribenzyltin naphthenate, tribenzyltin acetate, tribenzyltin acrylate, diphenyltin dilaurate, diphenyltin di-2-ethylhexatate, diphenyltin distearate, diphenyltin dinaphthenate, diphenyltin di acetate, diphenyltin diacrylate, di-n-butyltin dilaurate, di-n-butyltin di-2-ethylhexatate, di-n-butyltin distearate, di-n-butyltin dinaphthenate, di-n-butyltin diacetate, di-n-butyltin diacrylate, di-t-butyltin dilaurate, di-t-butyltin di-2-ethylhexatate, di-t-butyltin distearate, di-t-butyltin dinaphthenate, di-t-butyltin diacetate, di-t-butyltin diacrylate, di-isobutyltin dilaurate, di-isobutyltin di-2-ethylhaxatate, di-isobutyltin distearate, di-isobutyltin dinaphthenate, di-isobutyltin diacetate, di-isobutyltin diacrylate, di-isopropyltin dilaurate, di-isopropyltin di-2-ethylhexatate, di-isopropyltin distearate, di-isopropyltin dinaphthenate, di-isopropyltin diacetate, di-isopropyltin diacrylate, dihexyltin dilaurate, dihexyltin di-2-ethylhexatate, dihexyltin distearate, dihexyltin dinaphthenate, dihexyltin diacetate, dihexyltin diacrylate, di-2-ethylhexyltin dilaurate, di-2-ethylhexyltin di-2-ethylhexatate, di-2-ethylhexyltin distearate, di-2-ethylhexyltin dinaphthenate, di-2-ethylhexyltin diacetate, di-2-ethylhexyltin diacrylate, dioctyltin dilaurate, dioctyltin di-2-ethylhexatate, dioctyltin distearate, dioctyltin dinaphthenate, dioctyltin diacetate, dioctyltin diacrylate, distearyltin dilaurate, distearyltin di-2-ethylhexatate, distearyltin distearate, distearyltin dinaphthenate, distearyltin diacetate, distearyltin diacrylate, dibenzyltin dilaurate, dibenzyltin di-2-ethylhexatate, dibenzyltin distearate, dibenzyltin dinaphthenate, dibenzyltin diacetate, dibenzyltin diacrylate, phenyltin trilaurate, phenyltin tri-2-ethylhexatate, phenyltin trinaphthenate, phenyltin triacetate, phenyltin triacrylate, n-butyltin trilaurate, n-butyltin tri-2-ethylhexatate, n-butyltin trinaphthenate, n-butyltin triacetate, n-butyltin triacrylate, t-butyltin triluarate, t-butyltin tri-2-ethylhexylhexatate, t-butyltin trinaphthenate, t-butyltin triacetate, t-butyltin triacrylate, isobutyltin trilaurate, isobutyltin 2-ethylhexylhexatate, isobutyltin trinaphthenate, isobutyltin triacetate, isobutyltin triacrylate, isopropyltin trilaurate, isopropyltin 2-ethylhexylhexatate, isopropyltin trinaphthenate, isopropyltin triacetate, isopropyltin triacrylate, hexyltin trilaurae, hexyltin tri-2-ethylhexylhexatate, hexyltin trinaphthenate, hexyltin triacetate, hexyltin triacrylate, octyltin trilaurate, octyltin 2-ethylhexylhexatate, octyltin trinaphthenate, octyltin triacetate, octyltin triacrylate, 2-ethylhexyltin trilaurate, 2-ethylhexyltin tri-2-ethylhexylhexatate, 2-ethylhexyltin trinaphthenate, 2-ethylhexyltin triacetate, 2-ethylhexyltin triacrylate, searyltin trilaurate, stearyltin tri-2-ethylhexylhexatate, stearyltin trinaphthenate, stearyltin triacetate, stearyltin triacrylate, benzyltin trilaurate, benzyltin tri-2-ethylhexylhexatate, benzyltin trinapthenate, benzyltin triacetate, benzyltin triacrylate and the like.

As the compound shown by the formula (16), mention may be made of diphenyltin bismethylmaleate, diphenyltin bis-2-ethylhexylmaleate, diphenyltin bisoctylmaleate, diphenyltin bisbenzylmaleate, di-n-butyltin bismethylmaleate, di-n-butyltin bis-2-ethylhexylmaleate, di-n-butyltin bisoctylmaleate, di-n-butyltin bisbenzylmaleate, di-t-butyltin bismethylmaleate, di-t-butyltin bis-2-ethylhexylmaleate, di-t-butyltin bisoctylmaleate, di-t-butyltin bisbenzylmaleate, di-isobutyltin bismethylmaleate, di-isobutyltin bis-2-ethylhexylmaleate, di-isobutyltin bisoctylmaleate, di-isobutyltin bisbenzylmaleate, di-isopropyltin bismethylmaleate, di-isopropyltin bis-2-ethylhexylmaleate, di-isopropyltin bisoctylmaleate, di-isopropyltin bisbenzylmaleate, dihexyltin bismethylmaleate, dihexyltin bis-2-ethylhexylmaleate, dihexyltin bisoctylmaleate, dihexyltin bisbenzylmaleate, di-2-ethylhexyltin bismethylmaleate, di-2-ethylhexyltin bis-2-ethylhexylmaleate, di-2-ethylhexyltin bisoctylmaleate, di-2-ethylhexyltin bisbenzylmaleate, dioctyltin bismethylmaleate, dioctyltin bis-2-ethylhexylmaleate, dioctyltin bisoctylmaleate, dioctyltin bisbenzylmaleate, distearyltin bismethylmaleate, distearyltin bis-2-ethylhexylmaleate, distearyltin bisoctylmaleate, distearyltin bisbenzylmaleate, dibenzyltin bismethylmaleate, dibenzyltin bis-2-ethylhexylmaleate, dibenzyltin bisoctylmaleate, dibenzyltin bisbenzylmaleate, diphenyltin bismethyladipate, diphenyltin bis-2-ethylhexyladipate, diphenyltin bisoctyladipate, diphenyltin bisbenzyladipate, di-n-butyltin bismethyladipate, di-n-butyltin bis-2-ethylhexyladipate, di-n-butyltin bisoctyladipate, di-n-butyltin bisbenzyladipate, di-t-butyltin bismethyladipate, di-t-butyltin bis-2-ethylhexyladipate, di-t-butyltin bisoctyladipate, di-t-butyltin bisbenzyladipate, di-isobutyltin bismethyladipate, di-isobutyltin bis-2-ethylhexyladipate, di-isobutyltin bisoctyladipate, di-isobutyltin bisbenzyladipate, di-isopropyltin bismethyladipate, di-isopropyltin bis-2-ethylhexyladipate, di-isopropyltin bisoctyladipate, di-isopropyltin bisbenzyladipate, dihexyltin bismethyladipate, diheyxltin bis-2-ethylhexyladipate, dihexyltin bismethyladipate, dihexyltin bisbenzyladipate, di-2-ethylhexyltin bismethyladipate, di-2-ethylhexyltin bis-2-ethylhexyladipate, di-2-ethylhexyltin bisoctyladipate, di-2-ethylhexyltin bisbenzyladipate, dioctyltin bismethyladipate, dioctyltin bis-2-ethylhexyladipate, dioctyltin bisoctyladipate, distearyltin bismethyladipate, distearyltin bis-2-ethylhexyladipate, distearyltin bisoctyladipate, distearyltin bisbenzyladipate, dibenzyltin bismethyladipate, dibenzyltin bis-2-ethylhexyladipate, dibenzyltin bisoctyladipate, dibenzyltin bisbenzyladipate, derivatives of compounds each having two carboxylic groups such as malonic acid, malic acid, succinic acid and the like instead of malic acid or adipic acid, and so on.

As the compound shown by the formula (17), mention may be made of diphenyltin maleate, di-n-butyltin maleate, di-t-butyltin maleate, diisobutyltin maleate, di-isopropyltin maleate, dihexyltin maleate, di-2-ethylhexyltin maleate, dioctyltin maleate, distearyltin maleate, dibenzyltin maleate, diphenyltin adipate, di-n-butyltin adipate, di-t-butyltin adipate, di-isobutyltin adipate, di-isopropyltin adipate, dihexyltin adipate, di-2-ethylhexyltin adipate, dioctyltin adipate, distearyltin adipate, dibenzyltin adipate, derivatives of compounds each having two carboxylic groups such as malonic acid, malic acid, succinic acid and the like instead of malic acid or adipic acid, and so on.

The components (e)–(j) as a modifying agent may be used alone or in admixture of two or more components.

The effect on the cold flow is more improved by using a mixture of two or more components. Particularly, when using a combination of the component (i) or (j) and the component (e) or (g), the wear resistance and rebound resilience are further improved. In case of using two or more of the above components, the addition order is not particularly restricted, but it is preferable to firstly add the component (i) or (j) and subsequently add the component (e) or (g).

The amount of the modifying agent used to the component (a) is 0.01–200, preferably 0.1–150 as a molar ratio. When the amount is less than 0.01, the reaction does not sufficiently proceed and the effect of improving the wear resistance and cold flow is not developed, while when it exceeds 200, the effect of improving the properties is saturated from a viewpoint of economical reason, and an insoluble matter in toluene (gel) is undesirably created according to occasions.

It is desirable that the modification reaction is carried out at a temperature of not higher than 160° C., preferably −30° C.–+130° C. for 0.1–10 hours, preferably 0.2–5 hours.

After the modification reaction, an objective polymer can be recovered by adding a short-stop and a polymerization stabilizer to the reaction system, if necessary, and conducting well-known solvent-removing and drying operations in the production of the conjugated diene polymer.

The conjugated diene polymer obtained after the modification has a cis-1,4-bond content of not less than 90%, preferably not less than 93% and a Mw/Mn ratio of not more than 4, preferably not more than 3.5. When the cis-1,4-bond content is less than 90%, the wear resistance becomes poor. When the Mw/Mn ratio exceeds 4, the wear resistance becomes poor.

And also, the modified conjugated diene polymer has a vinyl-1,2 bond content of not more than 2.5%, preferably not more than 2.0%. When it exceeds 2.5%, the durability becomes poor.

Furthermore, the modified conjugated diene polymer is favorable to have a Mooney viscosity at 100° C. ($ML_{1+4}$, 100° C.) of 10–150. When the Mooney viscosity is less than 10, the wear resistance after vulcanization becomes poor, while when it exceeds 100, the processability in the kneading becomes poor.

Moreover, the weight-average molecular weight (Mw) in terms of polystyrene is usually 100,000–1,50,000, preferably 150,000–1,000,000. When Mw is outside the above range, the processability and vulcanization properties become undesirably poor.

The thus obtained polymer can be recovered by solvent-removing and drying operations after a process oil such as aromatic oil, naphthenic oil or the like is added in an amount of 5–100 parts by weight based on 100 parts by weight of the polymer prior to the removal of the solvent, if necessary.

The conjugated diene polymer(s) according to the invention is used in applications requiring mechanical properties and wear resistance such as tread and sidewall in tires for passenger car, truck and bus and winter-season tires such as studless tire or the like, various rubber members, hoses, belts, vibration damping rubbers, various industrial goods and the like by using the polymer alone or blending with another synthetic rubber or natural rubber, extending with a process oil, if necessary, and adding with a filler such as carbon black or the like, a vulcanizing agent, a vulcanization accelerator and the other usual additives and then vulcanizing them. As the synthetic rubber, use may be made of emulsion-polymerized SBR, solution-polymerized SBR, polyisoprene, EP(D)M, butyl rubber, hydrogenated BR, hydrogenated SBR and the like.

The following examples are given in illustration of the invention and are not intended as limitations thereof.

In these examples, part and % are by weight otherwise specified. And also, various measurements in these examples are conducted according to the following methods.

Mooney Viscosity ($ML_{1+4}$, 100° C.)

It is measured at a temperature of 100° C. for a measuring time of 4 minutes after the preliminary heating for 1 minute.

Number-average Molecular Weight (Mn), Weight-average Molecular Weight (Mw)

It is measured by using HLC-8120GPC made by Toso Co., ltd. and a differential refractometer as a detector under the following conditions:

Column: column GMHHXL made by Toso Co., Ltd.

Mobile phase: tetrahydrofuran

Microstructure (cis-1,4-bond Content, vinyl-1,2-bond Content)

It is measured by an infrared ray method (Morero's method).

Cold Flow

It is measured by extruding a polymer through an orifice of ¼ inch at a temperature of 50° C. under a pressure of 3.5 $lb/in^2$. After the polymer is left to stand for 10 minutes for obtaining a steady state, the extrusion rate is measured and the measured value is represented by milligram every minute (mg/min).

Metal Analysis

It is analyzed by an ICP emission spectroscopy after a sample is dry-ashed in an electric furnace (600° C.) and the obtained ash is dissolved in hydrochloric acid and diluted with a Millipore water.

[Vulcanization Properties]

Tensile Strength

It is measured according to JIS K6301. In this case, tensile strength at break (TB) and elongation at break (EB) are measured.

Rebound Resilience

It is measured at 50° C. by using a rebound resilience tester made by Dunlop Corp.

Wear Resistance

It is measured at a slip ratio of 60% and room temperature by using a Lambourn abrasion tester (made by Shimada Giken Co., Ltd.).

As to the measurement of vulcanization properties, a test specimen is produced by using a polymer prepared in the following example or comparative example and kneading it with other ingredients according to the following compounding recipe and then press-vulcanizing them at 145° C. for an optimum time.

| Compounding recipe | (part) |
|---|---|
| Polymer | 50 |
| Natural rubber | 50 |
| Carbon black ISAF | 50 |
| Zinc white | 3 |
| Stearic acid | 2 |
| Antioxidant (*1) | 1 |
| Vulcanization accelerator (*2) | 0.8 |
| Sulfur | 1.5 |

*1) N-isopropyl-N'-phenyl-p-phenylenediamine
*2) N-cyclohexyl-2-benzothiazyl sulfenamide

EXAMPLE 1

In a three-necked flask of 100 ml in capacity are weighed anhydrous magnesium chloride (0.1 mmol) and tri-2-ethylhexyl phosphate (0.2 mmol) is added dropwise, which are reacted by heating to 100° C. for 2 hours. After the completion of the reaction, 50 ml of toluene is added to prepare a toluene solution of a complex of tri-2-ethylhexyl phosphate with magnesium chloride.

Into an autoclave of 5 liter in capacity purged with nitrogen are charged 2.4 kg of cyclohexane and 300 g of 1,3-butadiene in a nitrogen atmosphere.

Into the resulting mixture is charged a catalyst obtained by previously mixing a cyclohexane solution containing neodymium versatate (0.04 mmol), a toluene solution of methylaluminoxane (3.6 mmol), hydrogenated diisobutylaluminum (3.6 mmol) and a toluene solution of a complex (0.04 mol) of tri-2-ethylhexyl phosphate with magnesium chloride and maturating them with an amount of 1,3-butadiene corresponding to 5 times of neodymium amount at 50° C. for 30 minutes to conduct polymerization at 50° C. for 60 minutes. The reaction conversion of 1,3-butadiene is approximately 100%.

Thereafter, a methanol solution containing 1.5 g of 2,4-di-t-butyl-p-cresol is added to stop polymerization, which is desolated by steam stripping and dried on a roll at 1 10C to obtain a polymer.

This polymer has a Mooney viscosity ($ML_{1+4}$, 100° C.) of 25, a cis-1,4 bond content of 96.8%, a vinyl-1,2 bond content of 0.9% and Mw/Mn of 2.1.

EXAMPLE 2

A polymer is obtained in the same manner as in Example 1 except that zinc chloride is used instead of magnesium chloride. The properties of this polymer and properties of a vulcanizate using the same are measured to obtain results as shown in Table 1.

EXAMPLE 3

A polymer is obtained in the same manner as in Example 2 except that 2-ethylhexanol is used instead of tri-2-ethylhexyl phosphate in Example 2. The properties of this polymer and properties of a vulcanizate using the same are measured to obtain results as shown in Table 1.

EXAMPLE 4

A polymer is obtained in the same manner as in Example 2 except that versatic acid is used instead of tri-2-ethylhexyl phosphate in Example 2. The properties of this polymer and properties of a vulcanizate using the same are measured to obtain results as shown in Table 1.

EXAMPLE 5

In a three-necked flask of 100 ml in capacity are weighed anhydrous magnesium chloride (0.1 mmol) and tri-2-ethylhexyl phosphate (0.2 mmol) is added dropwise, which are reacted by heating to 100° C. for 2 hours. After the completion of the reaction, 50 ml of toluene is added to prepare a toluene solution of a complex of tri-2-etiylhexyl phosphate with magnesium chloride.

Into an autoclave of 5 liter in capacity purged with nitrogen are charged 2.4 kg of cyclohexane and 300 g of 1,3-butadiene in a nitrogen atmosphere.

Into the resulting mixture is charged a catalyst obtained by previously mixing a cyclohexane solution containing neodymium versatate (0.04 mmol), a toluene solution of methylaluminoxane (3.6 mmol), hydrogenated diisobutylaluminum (3.6 mmol) and a toluene solution of a complex (0.04 mol) of tri-2-ethylhexyl phosphate with magnesium chloride and maturating them with an amount of 1,3-butadiene corresponding to 5 times of neodymium amount at 50° C. for 30 minutes to conduct polymerization at 50° C. for 60 minutes. The reaction conversion of 1,3-butadiene is approximately 100%.

Thereafter, dioctyltin bisoctylmaleate (1.08 mmol) is added while maintaining a temperature of the polymerization solution at 50° C. and thereafter left to stand for 30 minutes, and then a methanol solution containing 1.5 g of 2,4-di-t-butyl-p-cresol is added to stop polymerization, which is desolated by steam stripping and dried on a roll at 110° C. to obtain a modified polymer. The properties of this polymer and properties of a vulcanizate using the same are measured to obtain results as shown in Table 1.

EXAMPLE 6

A polymer is obtained in the same manner as in Example 5 except that the addition amount of methylaluminoxane is 2.4 mmol. The properties of this polymer and properties of a vulcanizate using the same are measured to obtain results as shown in Table 1.

EXAMPLE 7

A polymer is obtained in the same manner as in Example 5 except that the addition amount of methylaluminoxane is 1.2 mmol. The properties of this polymer and properties of a vulcanizate using the same are measured to obtain results as shown in Table 1.

EXAMPLE 8

A polymer is obtained in the same manner as in Example 5 except that manganese chloride is used instead of magnesium chloride. The properties of this polymer and properties of a vulcanizate using the same are measured to obtain results as shown in Table 1.

EXAMPLE 9

A polymer is obtained in the same manner as in Example 5 except that zinc chloride is used instead of magnesium chloride. The properties of this polymer and properties of a vulcanizate using the same are measured to obtain results as shown in Table 1.

EXAMPLE 10

A polymer is obtained in the same manner as in Example 5 except that cuprous chloride is used instead of magnesium chloride. The properties of this polymer and properties of a vulcanizate using the same are measured to obtain results as shown in Table 1.

EXAMPLE 11

A polymer is obtained in the same manner as in Example 5 except that cupric chloride is used instead of magnesium chloride. The properties of this polymer and properties of a vulcanizate using the same are measured to obtain results as shown in Table 1.

EXAMPLE 12

A polymer is obtained in the same manner as in Example 5 except that tricresyl phosphate is used instead of tri-2-ethylhexyl phosphate. The properties of this polymer and properties of a vulcanizate using the same are measured to obtain results as shown in Table 1.

EXAMPLE 13

A polymer is obtained in the same manner as in Example 5 except that acetylacetone is used instead of tri-2-ethylhexyl phosphate. The properties of this polymer and properties of a vulcanizate using the same are measured to obtain results as shown in Table 2.

EXAMPLE 14

A polymer is obtained in the same manner as in Example 5 except that versatic acid is used instead of tri-2-ethylhexyl phosphate. The properties of this polymer and properties of a vulcanizate using the same are measured to obtain results as shown in Table 2.

EXAMPLE 15

A polymer is obtained in the same manner as in Example 5 except that 2-ethylhexanol is used instead of tri-2-ethylhexyl phosphate. The properties of this polymer and properties of a vulcanizate using the same are measured to obtain results as shown in Table 2.

EXAMPLE 16

A polymer is obtained in the same manner as in Example 15 except that zinc chloride is used instead of magnesium chloride in Example 15. The properties of this polymer and properties of a vulcanizate using the same are measured to obtain results as shown in Table 2.

EXAMPLE 17

A polymer is obtained in the same manner as in Example 5 except that 1-decanol is used instead of tri-2-ethylhexyl phosphate. The properties of this polymer and properties of a vulcanizate using the same are measured to obtain results as shown in Table 2.

EXAMPLE 18

A polymer is obtained in the same manner as in Example 5 except that lauryl alcohol is used instead of tri-2-ethylhexyl phosphate. The properties of this polymer and properties of a vulcanizate using the same are measured to obtain results as shown in Table 2.

EXAMPLE 19

A polymer is obtained in the same manner as in Example 5 except that butyltin trichloride is used instead of dioctyltin bisoctylmaleate. The properties of this polymer and properties of a vulcanizate using the same are measured to obtain results as shown in Table 2.

EXAMPLE 20

A polymer is obtained in the same manner as in Example 5 except that polymeric type diphenylmethane diisocyanate is used instead of dioctyltin bisoctylmaleate. The properties of this polymer and properties of a vulcanizate using the same are measured to obtain results as shown in Table 2.

EXAMPLE 21

A polymer is obtained in the same manner as in Example 5 except that diethyl adipate is used instead of dioctyltin bisoctylmaleate. The properties of this polymer and properties of a vulcanizate using the same are measured to obtain results as shown in Table 2.

EXAMPLE 22

A polymer is obtained in the same manner as in Example 5 except that styrene oxide is used instead of dioctyltin bisoctylmaleate. The properties of this polymer and properties of a vulcanizate using the same are measured to obtain results as shown in Table 2.

EXAMPLE 23

A polymer is obtained in the same manner as in Example 5 except that 2,4,6-trichloro-1,3,5-triazine is used instead of dioctyltin bisoctylmaleate. The properties of this polymer and properties of a vulcanizate using the same are measured to obtain results as shown in Table 2.

EXAMPLE 24

In a three-necked flask of 100 ml in capacity are weighed anhydrous magnesium chloride (0.1 mmol) and tri-2-ethylhexyl phosphate (0.2 mmol) is added dropwise, which are reacted by heating to 100° C. for 2 hours. After the completion of the reaction, 50 ml of toluene is added to prepare a toluene solution of a complex of tri-2-ethylhexyl phosphate with magnesium chloride.

Into an autoclave of 5 liter in capacity purged with nitrogen are charged 2.4 kg of cyclohexane and 300 g of 1,3-butadiene in a nitrogen atmosphere.

Into the resulting mixture is charged a catalyst obtained by previously mixing a cyclohexane solution containing neodymium versatate (0.04 mmol), a toluene solution of methylaluminoxane (3.6 mmol), hydrogenated diisobutylaluminum (3.6 mmol) and a toluene solution of a complex (0.04 mol) of tri-2-ethylhexyl phosphate with magnesium chloride and maturating them with an amount of 1,3-butadiene corresponding to 5 times of neodymium amount at 50° C. for 30 minutes to conduct polymerization at 50° C. for 60 minutes. The reaction conversion of 1,3-butadiene is approximately 100%.

Thereafter, dioctyltin bisoctylmaleate (1.08 mmol) is added while maintaining a temperature of the polymerization solution at 50° C. and reacted for 15 minutes, and butyltin trichloride (1.08 mmol) is further added and thereafter left to stand for 30 minutes. Then, a methanol solution containing 1.5 g of 2,4-di-t-butyl-p-cresol is added to stop polymerization, which is desolvated by steam stripping and dried on a roll at 110° C. to obtain a modified polymer. The properties of this polymer and properties of a vulcanizate using the same are measured to obtain results as shown in Table 3.

EXAMPLE 25

A polymer is obtained in the same manner as in Example 24 except that styrene oxide is used instead of butyltin trichloride. The properties of this polymer and properties of a vulcanizate using the same are measured to obtain results as shown in Table 3.

EXAMPLE 26

A polymer is obtained in the same manner as in Example 24 except that diethyl adipate is used instead of dioctyltin bisoctylmaleate. The properties of this polymer and properties of a vulcanizate using the same are measured to obtain results as shown in Table 3.

COMPARATIVE EXAMPLE 1

Into an autoclave of 5 liter in capacity purged with nitrogen are charged 2.4 kg of cyclohexane and 300 g of 1,3-butadiene in a nitrogen atmosphere.

Into the resulting mixture is charged a catalyst obtained by previously mixing a cyclohexane solution containing neodymium versatate (0.04 mmol), a toluene solution of methylaluminoxane (3.6 mmol), hydrogenated diisobutylaluminum (3.6 mmol) and powder of magnesium chloride (0.04 mmol) and maturating them with an amount of 1,3-butadiene corresponding to 5 times of neodymium amount at 50° C. for 30 minutes to conduct polymerization at 50° C. for 60 minutes. The reaction conversion of 1,3-butadiene is approximately 17%. Thereafter, a methanol solution containing 1.5 g of 2,4-di-t-butyl-p-cresol is added to stop polymerization, which is desolvated by steam stripping and dried on a roll at 110C to obtain a polymer.

The polymer has a Mooney viscosity (ML1+4, 100° C.) of 88, a cis-1,4-bond content of 79.3%, a vinyl-1,2-bond content of 5.5% and a Mw/Mn ratio of 5.8. The properties of the polymer and properties of a vulcanizate using the same are measured to obtain results as shown in Table 3.

COMPARATIVE EXAMPLE 2

A polymer is obtained in the same manner as in Example 1 except that silicon tetrachloride is used instead of the reaction product of magnesium chloride and tri-2-ethylhexyl phosphate. The properties of this polymer and properties of a vulcanizate using the same are measured to obtain results as shown in Table 3.

COMPARATIVE EXAMPLE 3

A polymer is obtained in the same manner as in Example 1 except that diethylaluminum chloride is used instead of the reaction product of magnesium chloride and tri-2-ethylhexyl phosphate. The properties of this polymer and properties of a vulcanizate using the same are measured to obtain results as shown in Table 3.

COMPARATIVE EXAMPLE 4

A polymer is obtained in the same manner as in Example 5 except that silicon tetrachloride is used instead of the reaction product of magnesium chloride and tri-2-ethylhexyl phosphate. The properties of this polymer and properties of a vulcanizate using the same are measured to obtain results as shown in Table 3.

COMPARATIVE EXAMPLE 5

A polymer is obtained in the same manner as in Example 5 except that diethylaluminum chloride is used instead of the reaction product of magnesium chloride and tri-2-ethylhexyl phosphate. The properties of this polymer and properties of a vulcanizate using the same are measured to obtain results as shown in Table 3.

COMPARATIVE EXAMPLE 6

A polymer is obtained in the same manner as in Example 5 except that t-butyl chloride is used instead of the reaction product of magnesium chloride and tri-2-ethylhexyl phosphate. The properties of this polymer and properties of a vulcanizate using the same are measured to obtain results as shown in Table 3.

COMPARATIVE EXAMPLE 7

Vulcanization properties of a commercially available polybutadiene rubber (polybutadiene BR01, made by Japan Synthetic Rubber Co., Ltd.) are shown in Table 3.

TABLE 1(a)

| | Catalyst system (mmol) | | | | | |
|---|---|---|---|---|---|---|
| | Rare earth element compound | Aluminoxane | Organoaluminum compound | Metal halide | Lewis base | Modifying agent |
| Example 1 | Nd(ver)$_3$ (0.04) | MAO (3.6) | Ali-Bu$_2$H (3.6) | MgCl$_2$ (0.04) | tri-2-ethylhexyl phosphate (0.08) | — |
| Example 2 | Nd(ver)$_3$ (0.04) | MAO (3.6) | Ali-Bu$_2$H (3.6) | ZnCl$_2$ (0.04) | tri-2-ethylhexyl phosphate (0.08) | — |
| Example 3 | Nd(ver)$_3$ (0.04) | MAO (3.6) | Ali-Bu$_2$H (3.6) | ZnCl$_2$ (0.04) | 2-ethyl hexanol (0.08) | — |
| Example 4 | Nd(ver)$_3$ (0.04) | MAO (3.6) | Ali-Bu$_2$H (3.6) | ZnCl$_2$ (0.04) | versatic acid (0.08) | — |
| Example 5 | Nd(ver)$_3$ (0.04) | MAO (3.6) | Ali-Bu$_2$H (3.6) | MgCl$_2$ (0.04) | tri-2-ethylhexyl phsophate (0.08) | DOTBOM*7 (1.08) |
| Example 6 | Nd(ver)$_3$ (0.04) | MAO (2.4) | Ali-Bu$_2$H (3.6) | MgCl$_2$ (0.04) | tri-2-ethylhexyl phosphate (0.08) | DOTBOM*7 (1.08) |
| Example 7 | Nd(ver)$_3$ (0.04) | MAO (1.2) | Ali-Bu$_2$H (3.6) | MgCl$_2$ (0.04) | tri-2-ethylhexyl phosphate (0.08) | DOTBOM*7 (1.08) |
| Example 8 | Nd(ver)$_3$ (0.04) | MAO (3.6) | Ali-Bu$_2$H (3.6) | MnCl$_2$ (0.04) | tri-2-ethylhexyl phosphate (0.08) | DOTBOM*7 (1.08) |
| Example 9 | Nd(ver)$_3$ (0.04) | MAO (3.6) | Ali-Bu$_2$H (3.6) | ZnCl$_2$ (0.04) | tri-2-ethylhexyl phosphate (0.08) | DOTBOM*7 (1.08) |

TABLE 1(a)-continued

| | Catalyst system (mmol) | | | | | |
|---|---|---|---|---|---|---|
| | Rare earth element compound | Aluminoxane | Organoaluminum compound | Metal halide | Lewis base | Modifying agent |
| Example 10 | Nd(ver)$_3$ (0.04) | MAO (3.6) | Ali-Bu$_2$H (3.6) | CuCl (0.04) | tri-2-ethylhexyl phosphate (0.08) | DOTBOM[*7] (1.08) |
| Example 11 | Nd(ver)$_3$ (0.04) | MAO (3.6) | Ali-Bu$_2$H (3.6) | CuCl$_2$ (0.04) | tri-2-ethylhexyl phosphate (0.08) | DOTBOM[*7] (1.08) |
| Example 12 | Nd(ver)$_3$ (0.04) | MAO (3.6) | Ali-Bu$_2$H (3.6) | MgCl$_2$ (0.04) | tricresyl phosphate (0.08) | DOTBOM[*7] (1.08) |

TABLE 1(b)

| | Polymerization conditions | | Polymerization results | | | | | | | Properties of vulcanized | | | |
|---|---|---|---|---|---|---|---|---|---|---|---|---|---|
| | Temperature (°C.) | Time (hour) | Polymer yield (g) | Mooney viscosity | Molecular weight distribution[*1] (Mw/Mn) | cis-1,4-bond (%) | vinyl-1,2-bond (%) | Cold flow (mg/min) | Residual Al content (ppm) | TB (MPa) | EB (%) | Rebound resilience (%) | Wear resistance[*2] (INDEX) |
| Example 1 | 80 | 1 | 290 | 25 | 2.1 | 96.8 | 0.9 | 29.5 | 51 | 23.3 | 550 | 58 | 108 |
| Example 2 | 80 | 1 | 290 | 24 | 2.1 | 97.0 | 1.0 | 28.0 | 53 | 24.2 | 550 | 60 | 110 |
| Example 3 | 80 | 1 | 290 | 22 | 2.0 | 96.8 | 0.9 | 31.0 | 51 | 25.5 | 540 | 63 | 120 |
| Example 4 | 80 | 1 | 290 | 24 | 2.0 | 97.0 | 0.9 | 30.5 | 52 | 26.0 | 550 | 62 | 121 |
| Example 5 | 80 | 1 | 290 | 47 | 2.4 | 97.0 | 1.2 | 0.5 | 51 | 27.3 | 470 | 66 | 124 |
| Example 6 | 80 | 1 | 290 | 46 | 2.5 | 97.1 | 1.1 | 0.6 | 53 | 27.3 | 475 | 64 | 123 |
| Example 7 | 80 | 1 | 285 | 47 | 2.6 | 97.2 | 1.1 | 0.6 | 53 | 27.2 | 480 | 64 | 121 |
| Example 8 | 80 | 1 | 285 | 45 | 2.4 | 96.9 | 1.1 | 0.5 | 53 | 27.6 | 465 | 68 | 126 |
| Example 9 | 80 | 1 | 290 | 42 | 2.2 | 96.9 | 0.9 | 0.4 | 49 | 27.8 | 470 | 70 | 129 |
| Example 10 | 80 | 1 | 290 | 44 | 2.0 | 97.1 | 1.2 | 0.5 | 53 | 27.2 | 470 | 66 | 122 |
| Example 11 | 80 | 1 | 295 | 48 | 2.3 | 97.0 | 1.1 | 0.5 | 50 | 27.3 | 475 | 65 | 123 |
| Example 12 | 80 | 1 | 285 | 42 | 2.3 | 97.2 | 1.3 | 0.4 | 49 | 27.1 | 465 | 66 | 124 |

TABLE 2(a)

| | Catalyst system (mmol) | | | | | |
|---|---|---|---|---|---|---|
| | Rare earth element compound | Aluminoxane | Organoaluminum compound | Metal halide | Lewis base | Modifying agent |
| Example 13 | Nd(ver)$_3$ (0.04) | MAO (3.6) | Ali-Bu$_2$H (3.6) | MgCl$_2$ (0.04) | acetylacetone (0.08) | DOTBOM[*7] (1.08) |
| Example 14 | Nd(ver)$_3$ (0.04) | MAO (3.6) | Ali-Bu$_2$H (3.6) | MgCl$_2$ (0.04) | versatic acid (0.08) | DOTBOM[*7] (1.08) |
| Example 15 | Nd(ver)$_3$ (0.04) | MAO (3.6) | Ali-Bu$_2$H (3.6) | MgCl$_2$ (0.04) | 2-ethyl hexanol (0.08) | DOTBOM[*7] (1.08) |
| Example 16 | Nd(ver)$_3$ (0.04) | MAO (3.6) | Ali-Bu$_2$H (3.6) | ZnCl$_2$ (0.04) | 2-ethyl hexanol (0.08) | DOTBOM[*7] (1.08) |
| Example 17 | Nd(ver)$_3$ (0.04) | MAO (3.6) | Ali-Bu$_2$H (3.6) | MgCl$_2$ (0.04) | 1-decanol (0.08) | DOTBOM[*7] (1.08) |
| Example 18 | Nd(ver)$_3$ (0.04) | MAO (3.6) | Ali-Bu$_2$H (3.6) | MgCl$_2$ (0.04) | lauryl alcohol (0.08) | DOTBOM[*7] (1.08) |
| Example 19 | Nd(ver)$_3$ (0.04) | MAO (3.6) | Ali-Bu$_2$H (3.6) | MgCl$_2$ (0.04) | tri-2-ethylhexyl phosphate (0.08) | BuSnCl$_3$ (1.08) |

TABLE 2(a)-continued

| | Catalyst system (mmol) | | | | | |
|---|---|---|---|---|---|---|
| | Rare earth element compound | Aluminoxane | Organoaluminum compound | Metal halide | Lewis base | Modifying agent |
| Example 20 | Nd(ver)$_3$ (0.04) | MAO (3.6) | Ali-Bu$_2$H (3.6) | MgCl$_2$ (0.04) | tri-2-ethylhexyl phosphate (0.08) | c-MDI[*4] (1.08) |
| Example 21 | Nd(ver)$_3$ (0.04) | MAO (3.6) | Ali-Bu$_2$H (3.6) | MgCl$_2$ (0.04) | tri-2-ethylhexyl phosphate (0.08) | C$_4$H$_8$(CO$_2$Et)$_2$ (1.08) |
| Example 22 | Nd(ver)$_3$ (0.04) | MAO (3.6) | Ah-Bu$_2$H (3.6) | MgCl$_2$ (0.04) | tri-2-ethylhexyl phosphate (0.08) | STO[*5] (1.08) |
| Example 23 | Nd(ver)$_3$ (0.04) | MAO (3.6) | Ali-Bu$_2$H (3.6) | MgCl$_2$ (0.04) | tri-2-ethylhexyl phosphate (0.08) | TCT[*6] (1.08) |

TABLE 2(b)

| | Polymerization conditions | | Polymerization results | | | | | | | Properties of vulcanized | | | |
|---|---|---|---|---|---|---|---|---|---|---|---|---|---|
| | Temperature (°C.) | Time (hour) | Polymer yield (g) | Mooney viscosity | Molecular weight distribution[*1] (Mw/Mn) | cis-1,4-bond (%) | vinyl-1,2-bond (%) | Cold flow (mg/min) | Residual Al content (ppm) | TB (MPa) | EB (%) | Rebound resilience (%) | Wear resistance[*2] (INDEX) |
| Example 13 | 80 | 1 | 290 | 45 | 2.4 | 96.7 | 1.2 | 0.5 | 66 | 27.1 | 470 | 65 | 123 |
| Example 14 | 80 | 1 | 285 | 43 | 2.3 | 97.0 | 1.1 | 0.4 | 73 | 27.2 | 465 | 66 | 123 |
| Example 15 | 80 | 1 | 290 | 44 | 2.4 | 96.9 | 1.0 | 0.4 | 68 | 27.3 | 470 | 66 | 124 |
| Example 16 | 80 | 1 | 290 | 45 | 2.0 | 97.0 | 1.0 | 0.4 | 68 | 27.5 | 470 | 71 | 130 |
| Example 17 | 80 | 1 | 285 | 44 | 2.3 | 96.9 | 1.2 | 0.5 | 68 | 27.3 | 475 | 65 | 123 |
| Example 18 | 80 | 1 | 290 | 44 | 2.4 | 97.1 | 1.1 | 0.5 | 68 | 27.4 | 470 | 65 | 124 |
| Example 19 | 80 | 1 | 290 | 45 | 2.4 | 96.9 | 1.2 | 0.4 | 50 | 27.3 | 480 | 66 | 123 |
| Example 20 | 80 | 1 | 285 | 45 | 2.4 | 96.8 | 1.1 | 0.5 | 52 | 27.2 | 475 | 65 | 124 |
| Example 21 | 80 | 1 | 285 | 43 | 2.4 | 96.7 | 1.2 | 0.5 | 49 | 27.2 | 480 | 66 | 122 |
| Example 22 | 80 | 1 | 290 | 47 | 2.4 | 96.8 | 1.0 | 0.5 | 52 | 27.1 | 465 | 66 | 123 |
| Example 23 | 80 | 1 | 290 | 46 | 2.4 | 96.8 | 0.9 | 0.5 | 51 | 27.0 | 470 | 66 | 124 |

TABLE 3(a)

| | Catalyst system (mmol) | | | | | |
|---|---|---|---|---|---|---|
| | Rare earth element compound | Aluminoxane | Organoaluminum compound | Metal halide | Lewis base | Modifying agent |
| Example 24 | Nd(ver)$_3$ (0.04) | MAO (3.6) | Ali-Bu$_2$H (3.6) | MgCl$_2$ (0.04) | tri-2-ethylhexyl phosphate (0.08) | DOTBOM[*7] (1.08) BuSnCl$_3$ (1.08) |
| Example 25 | Nd(ver)$_3$ (0.04) | MAO (3.6) | Ali-Bu$_2$H (3.6) | MgCl$_2$ (0.04) | tri-2-ethylhexyl phosphate (0.08) | DOTBOM[*7] (1.08) STO[*5] (1.08) |
| Example 26 | Nd(ver)$_3$ (0.04) | MAO (3.6) | Ali-Bu$_2$H (3.6) | MgCl$_2$ (0.04) | tri-2-ethylhexyl phosphate (0.08) | C$_4$H$_8$(CO$_2$Et)$_2$ (1.08) BuSnCl$_3$ (1.08) |
| Comparative Example 1 | Nd(ver)$_3$ (0.04) | MAO (3.6) | Ali-Bu$_2$H (3.6) | MgCl$_2$ (0.04) | — | — |

TABLE 3(a)-continued

| | Catalyst system (mmol) | | | | | |
|---|---|---|---|---|---|---|
| | Rare earth element compound | Aluminoxane | Organoaluminum compound | Metal halide | Lewis base | Modifying agent |
| Comparative Example 2 | Nd(ver)$_3$ (0.04) | MAO (3.6) | Ali-Bu$_2$H (3.6) | SiCl$_4$ (0.02) | — | — |
| Comparative Example 3 | Nd(ver)$_3$ (0.04) | MAO (3.6) | Ali-Bu$_2$H (3.6) | AlEt$_2$Cl (0.08) | — | — |
| Comparative Example 4 | Nd(ver)$_3$ (0.04) | MAO (3.6) | Ali-Bu$_2$H (3.6) | SiCl$_4$ (0.02) | — | DOTBOM[*7] (1.08) |
| Comparative Example 5 | Nd(ver)$_3$ (0.04) | MAO (3.6) | Ali-Bu$_2$H (3.6) | AlEt$_2$Cl (0.08) | — | DOTBOM[*7] (1.08) |
| Comparative Example 6 | Nd(ver)$_3$ (0.04) | MAO (3.6) | Ali-Bu$_2$H (3.6) | t-BuCl (0.08) | (1.08) | DOTBOM[*7] |
| Comparative Example 7[*3] | — | — | — | — | — | — |

TABLE 3(b)

| | Polymerization conditions | | Polymerization results | | | | | | | Properties of vulcanized | | | |
|---|---|---|---|---|---|---|---|---|---|---|---|---|---|
| | Temperature (°C.) | Time (hour) | Polymer yield (g) | Mooney viscosity | Molecular weight distribution[*1] (Mw/Mn) | cis-1,4-bond (%) | vinyl-1,2-bond (%) | Cold flow (mg/min) | Residual Al content (ppm) | TB (MPa) | EB (%) | Rebound resilience (%) | Wear resistance[*2] (INDEX) |
| Example 24 | 80 | 1 | 285 | 48 | 2.5 | 96.7 | 1.2 | 0.1 | 49 | 28.3 | 490 | 71 | 129 |
| Example 25 | 80 | 1 | 285 | 49 | 2.5 | 96.7 | 1.2 | 0.2 | 49 | 27.9 | 480 | 68 | 125 |
| Example 26 | 80 | 1 | 285 | 48 | 2.5 | 96.7 | 1.2 | 0.1 | 49 | 27.6 | 485 | 67 | 125 |
| Comparative Example 1 | 80 | 1 | 50 | 88 | 5.8 | 79.3 | 5.5 | 0.1 | 185 | 21.6 | 360 | 45 | 81 |
| Comparative Example 2 | 80 | 1 | 295 | 49 | 2.6 | 95.5 | 1.3 | 26.5 | 178 | 22.1 | 530 | 56 | 105 |
| Comparative Example 3 | 80 | 1 | 280 | 50 | 2.8 | 95.1 | 1.4 | 25.5 | 190 | 20.8 | 520 | 55 | 104 |
| Comparative Example 4 | 80 | 1 | 295 | 49 | 2.8 | 95.6 | 1.3 | 0.4 | 178 | 26.4 | 510 | 62 | 118 |
| Comparative Example 5 | 80 | 1 | 280 | 50 | 3.1 | 95.1 | 1.5 | 0.5 | 190 | 26.5 | 505 | 60 | 116 |
| Comparative Example 6 | 80 | 1 | 285 | 48 | 3.2 | 96.5 | 1.5 | 0.4 | 185 | 26.4 | 490 | 60 | 115 |
| Comparative Example 7[*3] | — | — | — | — | — | — | — | — | — | 25.7 | 530 | 54 | 100 |

[*1]ratio of weight average molecular weight (Mw) to number average molecular weight (Mn)
[*2]index on the basis that Comparative Example 7 is 100
  The larger the index value, the better the property.
[*3]commercially available BR, made by JSR Corporation (JSR BR01)
[*4]polymeric type diphenylmethane diisocyanate
[*5]styrene oxide
[*6]2,4,6-trichloro-1,3,5-triazine
[*7]dioctyltin bisoctylmaleate Examples 1–26 are small in the ratio (Mw/Mn) and excellent in the strength at break, rebound resilience and wear resistance after the vulcanization as compared with Comparative Example 1, from which it is clear that the complex of metal halide and Lewis base is essential.

As seen from the comparison with Comparative Examples 2–4, when the addition amount of methylaluminoxane is same, the use of the reaction product between the metal halide and Lewis base can make the molecular weight distribution sharp and decrease the concentration of metal retaining in the polymer as compared with the use of silicon tetrachloride or diethylaluminum chloride.

When Examples 1, 5, 7 are compared with Comparative Examples 2–4, even if the addition amount of methylaluminoxane is decreased, the use of the catalyst system according to the invention is small in the ratio (Mw/Mn) and excellent in the properties after the vulcanization, from which it is clear that the addition amount of methylaluminoxane can be decreased and the residual Al concentration in the polymer can be reduced.

As seen from Examples 5–23, the cold flow can be controlled by reacting with the modifying agent after the completion of the polymerization. Further, as seen from Examples 24–26, the cold flow can be more controlled by using two kinds of the modifying agents together.

In the polymerization method according to the invention, the novel catalyst system used indicates a high polymerization activity to the conjugated diene compound, and the resulting polymers have a narrow molecular weight distribution and are excellent in the wear resistance and mechanical properties, so that the invention can industrially and widely be utilized as a method of producing conjugated diene polymers.

What is claimed is:

1. A method of producing a conjugated diene polymer which comprises polymerizing at least one conjugated diene compound with a catalyst consisting essentially of the following components (a) to (d):

Component (a): a compound containing a rare earth element of atomic number 57–71 in the Periodic Table or a compound obtained by reacting a compound containing a rare element of atomic number 57–71 with a Lewis base;

Component (b): an aluminoxane;

Component (c): an organoaluminum compound represented by general formula (1):

$$AlR^1R^2R^3 \tag{1}$$

wherein $R^1$ and $R^2$ are the same or different and are a hydrocarbon group having a carbon number of 1–10 or a hydrogen atom, and $R^3$ is a hydrocarbon group having a carbon number of 1–10 provided that $R^3$ is the same as or different from $R^1$ or $R^2$; and Component (d): a reaction product of a metal halide and a Lewis base.

2. The method according to claim 1, wherein metal halides of Group 1, Group 2 and/or Group 7 are used as the metal halide constituting the component (d), and phosphoric ester, diketone compound, carboxylic acid and/or alcohol are used as Lewis base.

3. The method according to claim 1, wherein the polymer has a content of cis-1,4-bond of not less than 90 mol % and a ratio (Mw/Mn) of weight average molecular weight (Mw) to number average molecular weight (Mn) as measured by a gel permeation chromatography of not more than 3.5.

4. A method of producing a conjugated diene polymer which comprises reacting with at least one compound selected from the group consisting of the following components (e), (f), (g), (h), (i), and (j) after the completion of the polymerization reaction defined in claim 1:

Component (e): a halogenated organometal compound, a halogenated metal compound or an organometal compound represented by a general formula (2), (3), (4), (5) or (6):

$$R^4_n M'X_{4-n} \tag{2}$$

$$M'X_4 \tag{3}$$

$$M'X_3 \tag{4}$$

$$R^4_n M'(R^5\text{—}COOR^6)_{4-n} \tag{5}$$

$$R^4_n M'(R^5\text{—}COR^6)_{4-n} \tag{6}$$

wherein $R^4$ and $R^5$ are the same or different and are a hydrocarbon group having a carbon number of 1–20, $R^6$ is a hydrocarbon group having a carbon number of 1–20 and may contain a carbonyl group or an ester group in its side chain, M' is a tin atom, a silicon atom, a germanium atom or a phosphorus atom, X is a halogen atom, and n is an integer of 0–3;

Component (f): a heterocumulene compound containing in its molecule a bond of a general formula (7)

$$Y\text{=}C\text{=}Z \tag{7}$$

wherein Y is a carbon atom, an oxygen atom, a nitrogen atom or a sulfur atom, and Z is an oxygen atom, a nitrogen atom or a sulfur atom;

Component (g): a hetero three-membered compound containing in its molecule a bond of a general formula (8)

wherein Y' is an oxygen atom, a nitrogen atom or a sulfur atom;

Component (h): a halogenated isocyano compound;

Component (i): a carboxylic acid, an acid halide, an ester compound, a carboxylic ester compound or an acid anhydride represented by general formula (9), (10), (11), (12), (13) or (14):

$$R^7\text{—}(COOH)_m \tag{9}$$

$$R^8\text{—}(COX)_m \tag{10}$$

$$R^9COO\text{—}R^{10} \tag{11}$$

$$R^{11}\text{—}OCOO\text{—}R^{12} \tag{12}$$

$$R^{13}\text{—}(COOCO\text{—}R^{14})_m \tag{13}$$

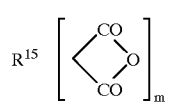

$$(14)$$

wherein $R^7$ to $R^{15}$ are the same or different and are a hydrocarbon group having a carbon number of 1–50, X is a halogen atom and m is an integer of 1–5;

Component (j): a metal salt of a carboxylic acid represented by a general formula (15), (16) or (17)

$$R^{16}_1 M''(OCOR^{17})_{4-1} \quad (15)$$

$$R^{18}_1 M''(OCO{-}R^{19}{-}COOR^{20})_{4-1} \quad (16)$$

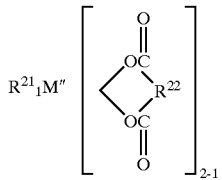
(17)

wherein $R^{16}$ to $R^{22}$ are the same or different and are a hydrocarbon group having a carbon number of 1–20, M" is a tin atom, a silicon atom or a germanium atom, and 1 is an integer of 0–2.

5. The method according to claim 4, wherein the reaction is carried out by using two or more compounds selected from the consisting of the components (e), (f), (g), (h), (i), and (j).

6. The method according to claim 5, wherein a combination of the component (i) or (j) with the component (e) or (g) is used.

7. The method according to claim 6, wherein the component (i) or (j) is added and then the component (e) or (g) is added.

8. The method according to claim 4, wherein the polymer has a content of cis-1,4-bond of not less than 90 mol % and a ratio (Mw/Mn) of weight average molecular weight (Mw) to number average molecular weight (Mn) as measured by a gel permeation chromatography of not more than 4.

* * * * *